United States Patent
Kondabathini et al.

(10) Patent No.: US 9,831,668 B2
(45) Date of Patent: Nov. 28, 2017

(54) POWER DISTRIBUTION SYSTEM FOR OFF-SHORE NATURAL RESOURCE PLATFORMS

(71) Applicant: ABB Technology Ltd., Zurich (CH)

(72) Inventors: Anil K. Kondabathini, Cary, NC (US); Zhenyuan Wang, Cary, NC (US); Jiuping Pan, Raleigh, NC (US); Jiaqi Liang, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 252 days.

(21) Appl. No.: 14/855,569

(22) Filed: Sep. 16, 2015

(65) Prior Publication Data

US 2017/0077699 A1    Mar. 16, 2017

(51) Int. Cl.
| | |
|---|---|
| H02J 1/10 | (2006.01) |
| H02J 3/36 | (2006.01) |
| H02J 3/38 | (2006.01) |
| H02J 1/00 | (2006.01) |
| H02J 11/00 | (2006.01) |

(52) U.S. Cl.
CPC ........ *H02J 1/10* (2013.01); *H02J 1/00* (2013.01); *H02J 3/36* (2013.01); *H02J 3/382* (2013.01); *H02J 11/00* (2013.01); *Y02E 60/60* (2013.01); *Y02P 80/14* (2015.11); *Y02P 80/152* (2015.11)

(58) Field of Classification Search
CPC ........ H02J 1/00; H02J 1/10; H02J 3/36; H02J 3/38; H02J 3/382; H02J 11/00; Y02P 80/14; Y02P 80/152; Y02E 60/60; Y10T 317/305; Y10T 307/615; Y10T 307/718
USPC ............................................. 307/18, 64, 84
See application file for complete search history.

(56) References Cited

U.S. PATENT DOCUMENTS

| | | |
|---|---|---|
| 7,880,419 B2 | 2/2011 | Sihler et al. |
| 2004/0095023 A1 | 5/2004 | Jacobson et al. |
| 2006/0163880 A1 | 6/2006 | Wobben |
| 2011/0215650 A1 | 9/2011 | Slocum et al. |
| 2013/0197704 A1 | 8/2013 | Pan et al. |
| 2013/0200714 A1 | 8/2013 | Pan et al. |
| 2015/0188315 A1 | 7/2015 | Hytten et al. |

FOREIGN PATENT DOCUMENTS

EP    2293407 A1    3/2011

OTHER PUBLICATIONS

Extended European Search Report, European Application No. 16185819.6-1804 / 3151356, dated Mar. 8, 2017, 7 pages.

(Continued)

*Primary Examiner* — Hal Kaplan
(74) *Attorney, Agent, or Firm* — Barnes & Thornburg LLP

(57) ABSTRACT

A power distribution system for off-shore natural resource platforms includes an off-shore medium voltage direct current (MVDC) power bus. The MVDC power bus includes multiple power bus segments, each of which may be connected to one or more other power bus segments via a corresponding circuit breaker. Each power bus segment may also be electrically coupled to an off-shore renewable energy source, such as a wind farm, and/or an off-shore drilling platform. The off-shore drilling platforms may include local power distribution systems electrically connected to a corresponding power bus segment via a circuit breaker to receive power from the MVDC power bus and supply power to local equipment of the off-shore drilling platform.

21 Claims, 5 Drawing Sheets

(56) References Cited

OTHER PUBLICATIONS

Xu, et al., "Grid Integration of Large Offshore Wind Energy and Oil 7 Gas Installations Using LCC HVDC Transmission system" 2010 International Symposium on Power Electronics Electrical Drives Automation and Motion (SPEEDAM), 2010, pp. 784-791.

Hadiya, M., "Case study of offshore wind farm integration to offshore oil and gas platforms as an isolated system—System Topologies, Steady State and Dynamic Aspects", Jul. 2011, Norwegian University of Science and Technology, 139 pages.

Svendsen, H.G. et al., "Integration of offshore wind farm with multiple oil and gas platforms" 2011 IEEE Trondheim PowerTech, 6 pages.

POWER DISTRIBUTION SYSTEM FOR OFF-SHORE NATURAL RESOURCE PLATFORMS

BACKGROUND

Off-shore drilling platforms are large industrial structures used to extract natural resources, such as oil and/or gas, from the ocean floor. To facilitate their purpose, off-shore drilling platforms include a variety of powered equipment such as drills, motors, pumps, compressors, and other oil/gas extraction equipment. Although some off-shore drilling platforms are powered by local engine-driven generators, many drilling platforms rely on a supply of power from on-shore energy facilities due to high power demand and their remote location. In either case, such typical off-shore platforms may include some amount of local renewable energy production (e.g., via a local wind turbine) and/or energy storage.

The on-shore energy facilities provide power to the drilling platforms via a power supply interconnection, which may extend from the shore to the drilling platform. In a typical off-shore power distribution system, the power supply interconnection is embodied as a high voltage alternating current (HVAC) interconnection, which may connect multiple drilling platforms to support AC loads (e.g., AC motors or drills) of the drilling platform. Power transformers are needed at drilling platforms for voltage transformation between the HVAC power supply and the AC loads. In other systems, a high voltage direct current (HVDC) interconnection may be used to provide power to drilling platforms. In such systems, both AC/DC converters and power transformers are required at the drilling platforms to facilitate power conversion and voltage transformation between the HVDC power supply and the AC loads. Alternatively, in some cases, one drilling platform may be enhanced for central voltage transformation or both power conversion and voltage transformation.

SUMMARY

According to an aspect, an off-shore medium voltage direct current (MVDC) power distribution system for supplying power to off-shore equipment may include an off-shore MVDC power bus. The off-shore MVDC power bus may include a plurality of power bus segments and each power bus segment may be electrically connected to at least one other power bus segment via a circuit breaker. Additionally, at least one power bus segment of the plurality of power bus segments may be electrically coupled to an off-shore renewable energy source configured to supply power to the off-shore MVDC power bus, and the renewable energy source may include an off-shore energy storage to reduce variance of power delivery from the renewable energy source. Further, at least one power bus segment of the plurality of power bus segments may be electrically coupled to a local power distribution system of an off-shore drilling platform. The local power distribution system may be configured to receive power from the off-shore MVDC power bus and supply power to a local load of the drilling platform.

In some embodiments, the off-shore MVDC power bus may be embodied as an off-shore MVDC power bus ring network and each power bus segment may be electrically connected to only two other power bus segments via corresponding circuit breakers. Alternatively, in other embodiments, the off-shore MVDC power bus may be embodied as an off-shore MVDC power bus mesh network.

Additionally, in some embodiments, the off-shore renewable energy source may include one or more wind turbines configured to supply power to the off-shore MVDC power bus via the corresponding at least one power bus segment. Additionally, a power bus segment of the plurality of power bus segments may be electrically connected to the off-shore renewable energy source via a corresponding circuit breaker. In some embodiments, the MVDC power distribution system may include a plurality of off-shore renewable energy sources and each off-shore renewable energy source may be electrically connected to a different power bus segment of the plurality of power bus segments via a corresponding circuit breaker.

In some embodiments, a power bus segment of the plurality of power bus segments may be electrically connected to the local power distribution system via a corresponding circuit breaker. Additionally, in some embodiments, the local load may include an alternating current (AC) load and the local power distribution system may include a direct current-to-alternating current (DC-AC) inverter configured to generate an AC power to the AC load based on a DC power supplied by the off-shore MVDC power bus. Further, in some embodiments, the local power distribution system may include a local power generation system to supply power to the local power distribution system and, in some embodiments, the local power distribution system may be embodied as an engine-driven diesel or gas generator.

Additionally, in some embodiments, the MVDC power distribution system may include a plurality of drilling platforms and each drilling platform may include a local power distribution system electrically connected to a different power bus segment of the plurality of power bus segments via a corresponding circuit breaker. In some embodiments, the local power distribution system of each drilling platform may include a local energy management system configured to control operation of the corresponding local power distribution system. In such embodiments, each local energy management system may control the amount of power extracted from the off-shore MVDC power bus by the local power distribution system and the amount of power supplied by the corresponding power bus segment to other power bus segments of the off-shore MVDC power bus.

In some embodiments, the local power distribution system may be electrically connected to the corresponding power bus segment via a corresponding circuit breaker and may include a local energy management system configured to control operation of the local power distribution system. In such embodiments, the off-shore renewable energy source may include a controller configured to control operation of the renewable energy source, and the local energy management system may be configured to communicate with the controller to control delivery of the power from the off-shore renewable energy source to the off-shore MVDC power bus.

Additionally, in some embodiments, the off-shore MVDC power distribution may also include an on-shore supply link electrically coupled to a power bus segment of the plurality of power bus segments. In such embodiments, the on-shore supply link may be configured to provide power to the off-shore MVDC power bus from an on-shore power source. In some embodiments, the on-shore supply link may be embodied as a MVDC power link, a high voltage alternating current (HVAC) power link, or a high voltage direct current (HVDC) power link.

According to another aspect, an off-shore medium voltage direct current (MVDC) power distribution system for supplying power to off-shore equipment may include an offshore MVDC power bus, a plurality of off-shore renewable energy sources, a plurality off-shore drilling platforms, and an on-shore supply link. The off-shore MVDC power bus may include a plurality of power bus segments, and each power bus segment may be electrically connected to at least one other power bus segment via a circuit breaker. Additionally, each off-shore renewable energy source may be electrically connected to a different power bus segment of the plurality of power bus segments via a corresponding circuit breaker, and each renewable energy source may include an off-shore energy storage to reduce variance of power delivery from the corresponding renewable energy source. Further, each off-shore drilling platform may include a local power distribution system electrically connected to a different power bus segment of the plurality of power bus segments via a corresponding circuit breaker. The on-shore supply link may be electrically connected to a power bus segment of the plurality of power bus segments via a corresponding circuit breaker and be configured to provide power to the off-shore MVDC power bus from an on-shore power source.

In some embodiments, the off-shore MVDC power bus may be embodied as an off-shore MVDC power bus ring network. In such embodiments, each power bus segment may be electrically connected to only two other power bus segments via corresponding circuit breakers. Alternatively, in other embodiments, the off-shore MVDC power bus may be embodied as an off-shore MVDC power bus mesh network. Additionally, in some embodiments, the on-shore supply link may be embodied as a MVDC power link, a high voltage alternating current (HVAC) power link, or a high voltage direct current (HVDC) power link.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
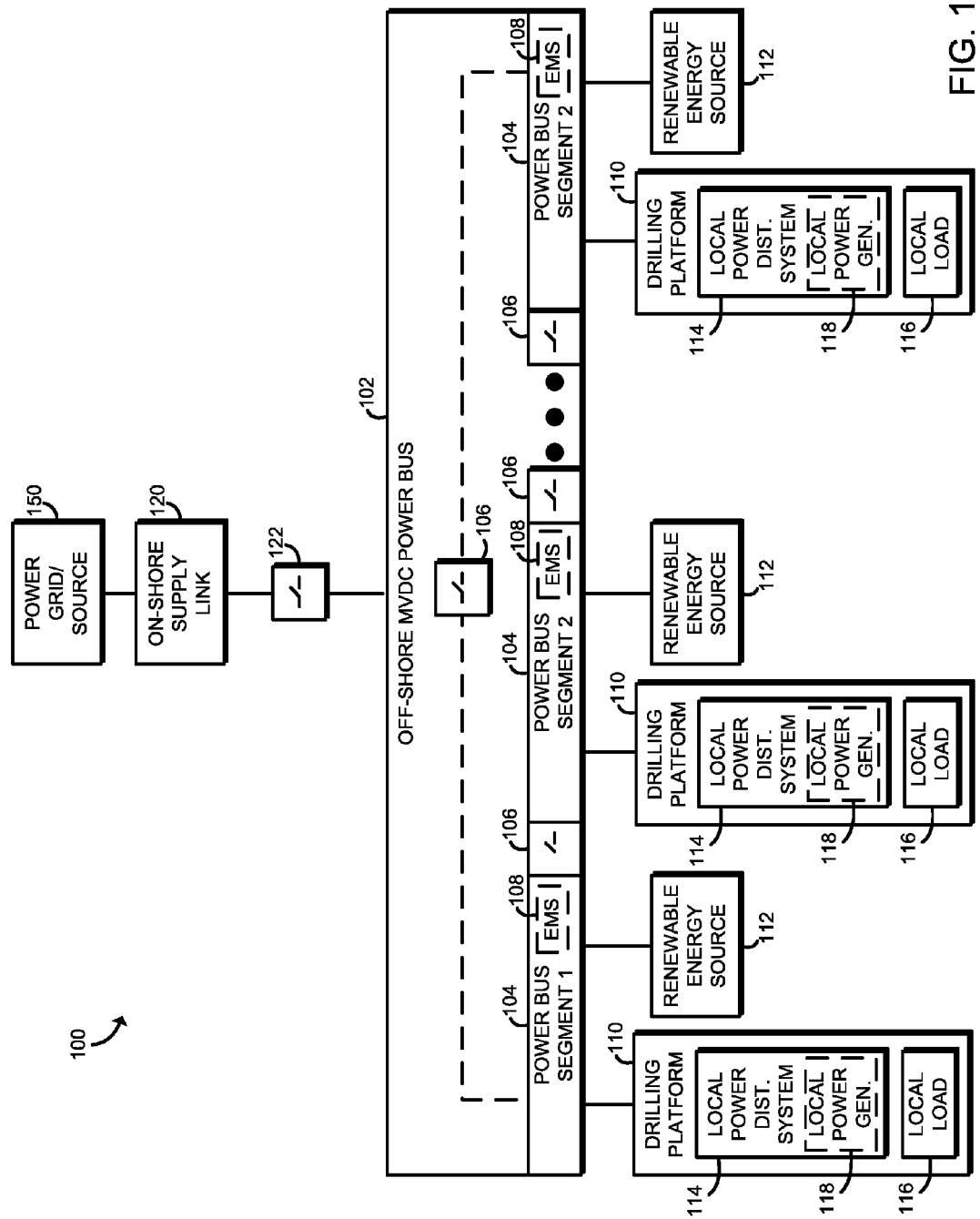
FIG. 1 is a simplified block diagram of at least one embodiment of a medium voltage direct current (MVDC) power distribution system for supply power to off-shore oil and/or gas drill platforms.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative medium voltage direct current (MVDC) power distribution system 100 for supplying power to one or more off-shore drilling platform operations includes an off-shore MVDC power bus 102, which is formed from one or more power bus segments 104. As discussed in more detail below, each power bus segment 104 is electrically connected to one or more other power bus segments 104 by a corresponding direct current (DC) circuit breaker 106 to form a particular network architecture. The MVDC power bus 102, and individual power bus segments 104, may be embodied as any type of power interconnect capable of carrying a medium voltage direct current power, such as a power cables, wires, or similar structure. The magnitude of the DC voltage carried by the MVDC power bus 102 may range from about 10 kilovolts DC to about 50 kilovolts DC depending on the power requirements of the associated loads. It should be appreciated that the MVDC power bus 102 is located off-shore and may be located under the surface of the body of water in which the MVDC power bus 102 is deployed.

The MVDC power distribution system 100 also includes one or more off-shore drilling platforms 110 and one or more renewable energy sources 112. Each off-shore drilling platform 110 and renewable energy source 112 is electrically coupled to a corresponding power bus segment 104 of the off-shore MVDC power bus 102 to extract power therefrom or supply power thereto, respectively. For example, in some embodiments, each power bus segment 104 may be electrically coupled to a corresponding off-shore drilling platform 110 and a corresponding renewable energy source 112. However, in other embodiments, only one or a sub-set of power bus segments 104 may be electrically coupled to a corresponding off-shore drilling platform 110 and/or a corresponding renewable energy source 112 depending on particular characteristics of the MVDC power distribution system 100 such as size, power rating, and the like.

During operation, each of the renewable energy sources 112 is configured to provide direct current (DC) power to the off-shore MVDC power bus 102 which, in turn, provides DC power to a local power distribution system 114 of each off-shore drilling platform 110 connected to a corresponding power bus segment 104 of the off-shore MVDC power bus 102. Each local power distribution system 114 may provide DC or alternating current (AC) power to various local loads 116 of the corresponding off-shore drilling platform 110. The distribution of power of each power bus segment 104, including any associated off-shore drilling platform 110 and/or renewable energy source 112, may be controlled by an energy management system 108, which may be embodied as a local or distributed energy management system 108. The energy management systems 108 may communicate between each other, and with the local power distribution systems 114 and the renewable energy sources 112, to control the power delivery and flow between the relative power bus segments 104.

The network architecture of the power bus segments 104 is configured such that a single point of failure of the off-shore MVDC power bus 102 may be isolated by disconnecting the associated power bus segment 104 via actuation of the corresponding DC circuit breakers 106. In this way, one or more improperly functioning power bus segments 104 may be removed or isolated from properly functioning power bus segments 104 to reduce any adverse effects of the failure to the MVDC power distribution system as a whole.

Each off-shore drilling platform 110 may be embodied as any type of natural resource extraction system configured for off-shore deployment and use. In the illustrative embodiment, each drilling platform 110 is embodied as an off-shore oil and/or gas drilling platform 110, but drilling platforms for other types of natural resources may be used in other embodiments. As discussed above, each drilling platform 110 includes a local power distribution system 114, which is electrically coupled to a power bus segment 104 of the off-shore MVDC power bus 102 and which supplies power to a local load 116. As discussed in more detail below, the local load may include one or more AC loads and/or DC loads, such as motors, drills, compressors, and/or other powered equipment commonly found on an off-shore drilling platform. In some embodiments, the local power distribution system 114 may also include a local power generation system 118. Illustratively, the local power generation system 118 is embodied as engine-driven diesel/gas generator. However, in other embodiments, one or more of the local power generation systems 118 may be embodied as other types of power generation devices and/or systems configured for operation on the corresponding off-shore drilling platform 110.

Each of the renewable energy sources 112 may be embodied as, or otherwise include, any type of renewable energy source capable of generating an amount of power to supply to the off-shore MVDC power bus 102. In the illustrative embodiment, each renewable energy source 112 is embodied as, or otherwise includes, one or more wind turbines configured to convert kinetic energy derived from wind into electrical power. However, in other embodiments, other types of renewable energy sources may be used including, but not limited to, photovoltaic modules configured to convert solar energy into electrical power and/or wave energy converters configured to convert energy from ocean surface waves into electrical power. For better utilization of intermittent energy production, each renewable energy source 112 may also include a local power storage for compensating the power produced by the local renewable energy sources.

To increase the reliability of power generation and supply by the MVDC power bus 102, the MVDC power distribution system 100 may also include one or more on-shore supply links 120. The on-shore supply link 120 is electrically coupled an on-shore power grid or source 150, such as an on-shore power grid, and to one or more power bus segments 104 of the off-shore MVDC power bus 102 via a corresponding circuit breaker 122. The on-shore supply link 120 is configured to supply power to the MVDC power bus 102 during those times in which the power supplied by the renewable energy sources is inadequate to meet the power demands of the off-shore drilling platforms 110. Similarly, if a surplus of power is generated by the renewable energy sources 112 (i.e., more power than required by the off-shore drilling platforms 110), any such surplus power may be supplied back to the power grid/source 150 via the on-shore supply link 120 to reduce the overall power cost of the off-shore MVDC power bus 102.

The on-shore supply link 120 may be embodied as any type of power interconnect capable of carrying power from the power grid/source 150 to the off-shore MVDC power bus 102, such as a power cables, wires, or similar structures. Depending on the particular features of the MVDC power distribution system 100, the on-shore supply link 120 may be embodied as a MVDC power link, a high voltage alternating current (HVAC) power link, or a high voltage direct current power link (HVDC) as discussed in more detail below.

Figure 2:
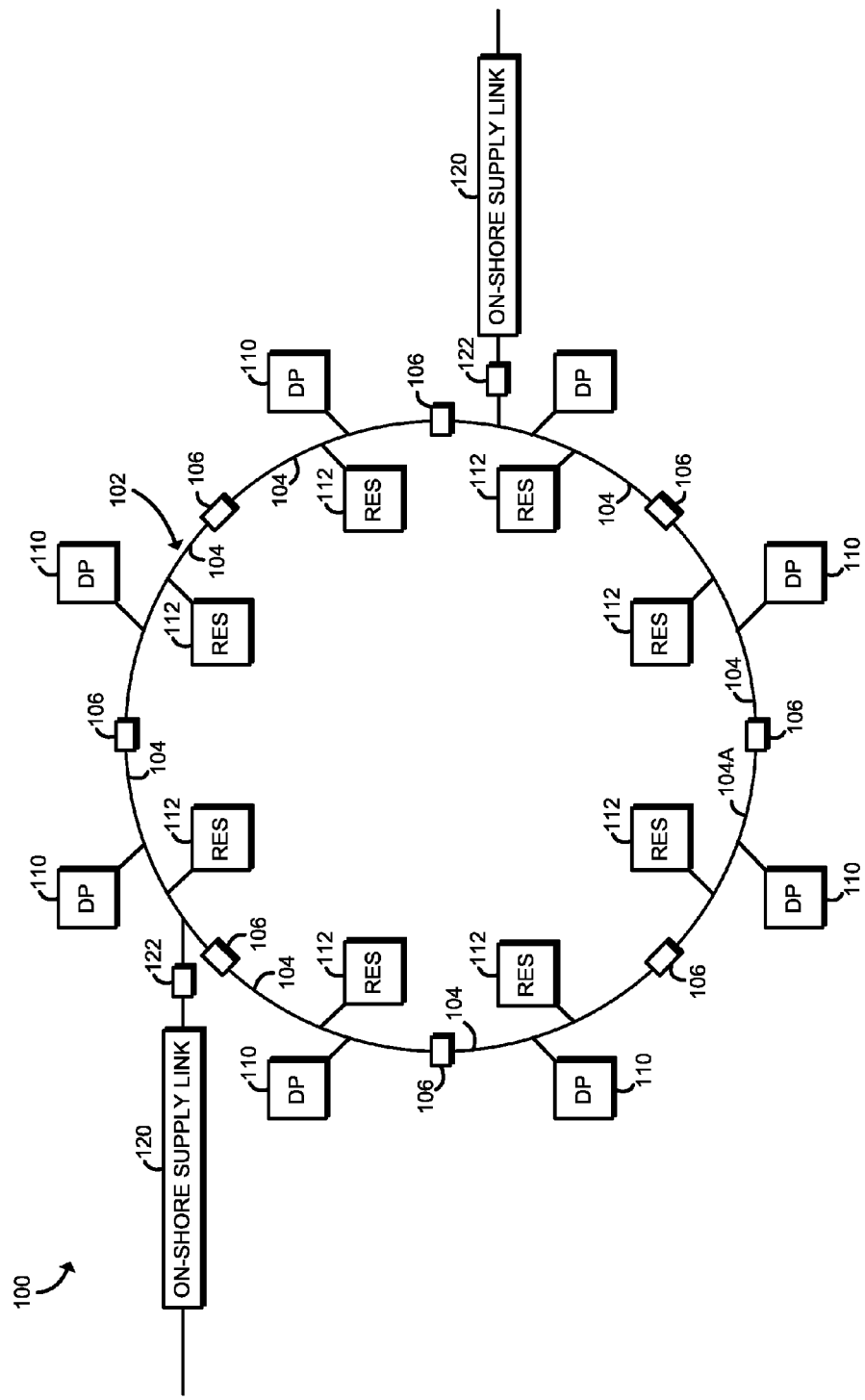
FIG. 2 is a simplified block diagram of at least one embodiment of a MVDC off-shore power bus of the MVDC power distribution system of FIG. 1.

Referring now to FIG. 2, in an illustrative embodiment, the off-shore MVDC power bus 102 may be embodied as a MVDC power bus ring network. In such embodiments, each power bus segment 104 is electrically connected to two other power bus segments 104 via corresponding DC circuit breakers 106 to form a ring or circle. As discussed above and illustratively shown, each power bus segment 104 may be electrically coupled to a corresponding off-shore drilling platform 110 and renewable energy source 112. Of course, in other embodiments, some power bus segments 104 may be electrically coupled to only an off-shore drilling platform 110, only a renewable energy source 112, or to neither. It should be appreciated that the ring architecture of the MVDC power bus 102 allows power to be evenly distributed about the MVDC power bus 102, regardless of where the power is initially produced or finally consumed. Additionally, the ring architecture of the MVDC power bus 102 allows isolation of sections of the bus 102 (i.e., one or more power bus segments 104). For example, should the power bus segment 104A (see bottom of FIG. 2) develop a failure, that power bus segment 104A may be isolated from the other power bus segments 104 of the MVDC power bus 102 by activation of the circuit breakers 106 coupled to the power bus segment 104A. In a similar manner, should the remaining portion of the MVDC power bus 102 experience a failure, the power bus segment 104A may be isolated from the remaining portion of the MVDC power bus 102 by activation of the circuit breakers 106 coupled to the power bus segment 104A. In this way, the power bus segment 104A may continue proper operation without interference from the failing portions of the MVDC power bus 102. Once the failures are attended to, any isolated power bus segments 104 may be reconnected to the other power bus segments 104 to reform the MVDC power bus ring network.

Figure 3:
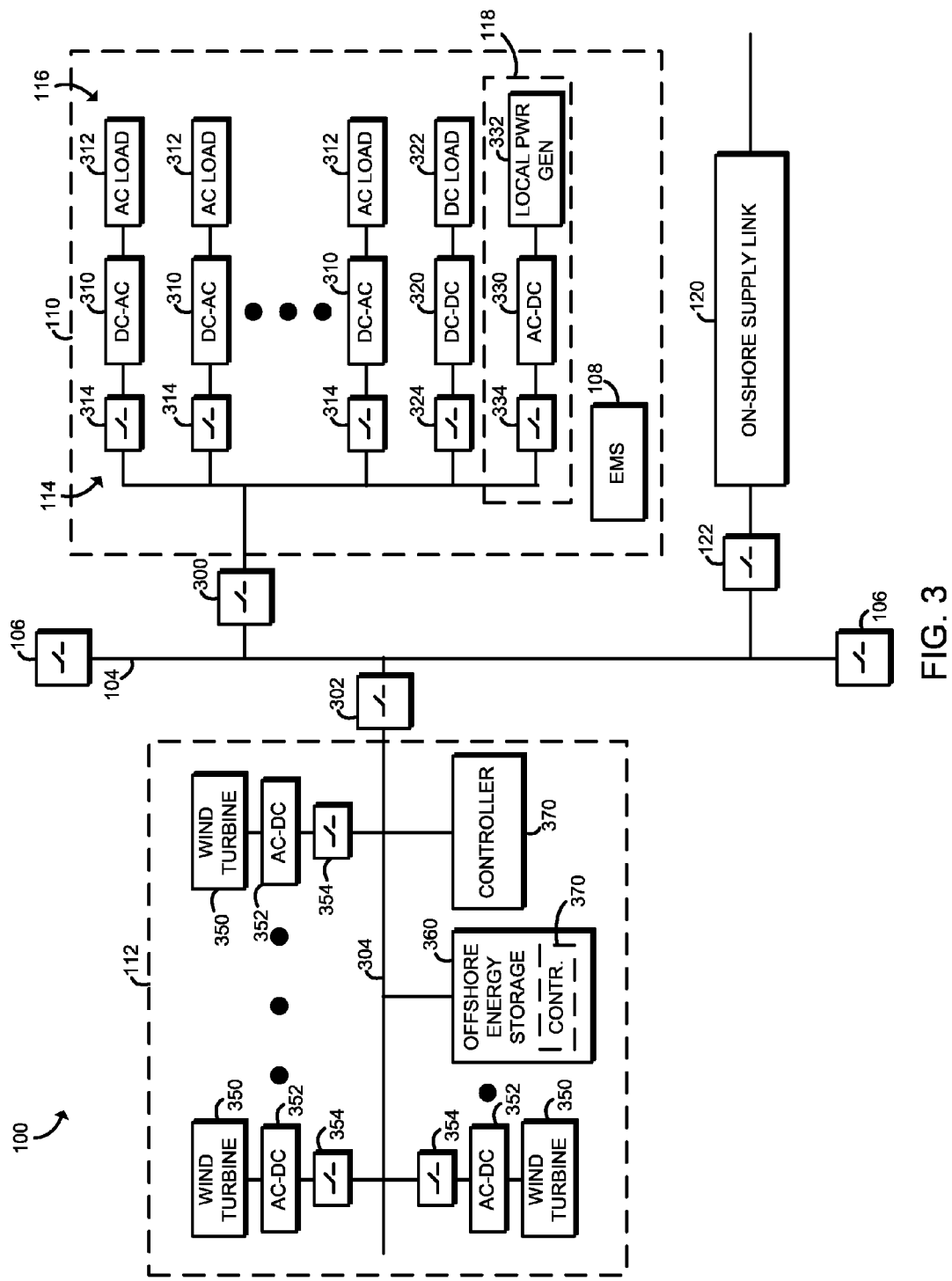
FIG. 3 is a simplified block diagram of at least one embodiment of an isolatable section of the MVDC off-shore power bus of FIG. 2.

Referring now to FIG. 3 and as discussed above, one or more power bus segments 104 of the MVDC power bus 102 may be electrically coupled to a corresponding drilling platform 110 and/or corresponding renewable energy source 112 depending on the particular configuration of the MVDC power bus 102. As shown in FIG. 3, the local power distribution system 114 of the off-shore drilling platform 110 is electrically connected to the associated power bus segment 104 via a DC circuit breaker 300. The local power distribution system 114 may include any number and type of power distribution components to facilitate power delivery to the local load 116. For example, in the illustrative embodiment, the local power distribution system 114 includes several direct current-to-alternating current (DC-AC) inverters 310 electrically connected to the DC circuit breaker 300 via a local DC circuit breaker 314 to receive DC power from the MVDC power bus 102. Each DC-AC inverter 310 is also electrically connected to a corresponding AC load 312 and configured to convert the DC power from the MVDC power bus 102 to an AC power to supply to the AC load 312. Additionally, the local power distribution system 114 includes one or more direct current-to-direct current (DC-DC) inverters 320 electrically connected to the DC circuit breaker 300 via a local DC circuit breaker 324 to receive DC power from the MVDC power bus 102. Each DC-DC inverter 320 is also electrically connected to a corresponding DC load 322 and configured to convert the DC power from the MVDC power bus 102 to a different DC power (e.g., at a different DC voltage) to supply to the DC load 322. Illustratively, the local power distribution system 114 also includes a local power generation system 332, which may be embodied as an engine-driven diesel/gas generator as discussed above. The local power generation system 332 is electrically connected to an AC-DC inverter 330 to convert an AC output of the local power generation system 332 to a DC output, which is supplied to the MVDC power bus 102 via a local DC 334. Of course, the local power distribution system 114 may include additional AC and/or DC loads and local power generation systems 118 in other embodiments.

The renewable energy source 112 is also electrically connected to the associated power bus segment 104 via a DC circuit breaker 302. In the illustrative embodiment, the renewable energy source 112 is embodied as a wind farm and may include multiple wind turbines 350. Each wind turbine 350 is configured to generate an AC power output in response to local wind, which is converted to a DC power via an associated AC-DC inverter 352. Each AC-DC inverter 352 is electrically connected to a local power bus 304 via a corresponding DC circuit breaker 354. As discussed above, each renewable energy source 112 may also include an off-shore energy storage 360, which may also be electrically connected to the local power bus 304. The off-shore energy storage 360 may store excess energy produced by the wind turbines 350 during periods in which the energy production is greater than the energy consumption of the local off-shore drilling platform 110 and/or the MVDC power bus 102 as a whole (i.e., when the total power consumption of the off-shore drilling platforms 110 is less than the power produced by the renewable energy sources 112). Additionally, the power stored in the off-shore energy storage 360 may be used to compensate for intermittent energy production of the wind turbines 350 or other renewable energy sources 112.

Each renewable energy source 112 may also include a controller 370 configured to control the power production of the renewable energy source 112. For example, the controller 370 may control when power generated by the wind turbines 350 is stored in the off-shore energy storage 360 and when such power is delivered to the MVDC power bus 102 via the corresponding power bus segment 104. The controller 370 may be embodied as any type of control circuit or device including, but not limited to a programmable logic controller and/or other industrial controller.

In the illustrative embodiment, the controller 370 may be configured to communicate with the energy management system 108, which may be located on the off-shore drilling platform 110. The energy management system 108 may control operation of the local power distribution system 114 depending on the information received from the controller 370 (e.g., the present amount of power produced by the wind turbines 350 or stored in the off-shore energy storage 360). Additionally, the energy management system 108 may control the amount of DC power delivered from the local power bus segment 104. For example, the energy management system 108 may control whether any power produced by the renewable energy source 112 is supplied to the MVDC power bus 102 for consumption by remotely located drilling platforms 110 based on the present amount of power available and the present power consumption of the local loads 116.

Figure 4:
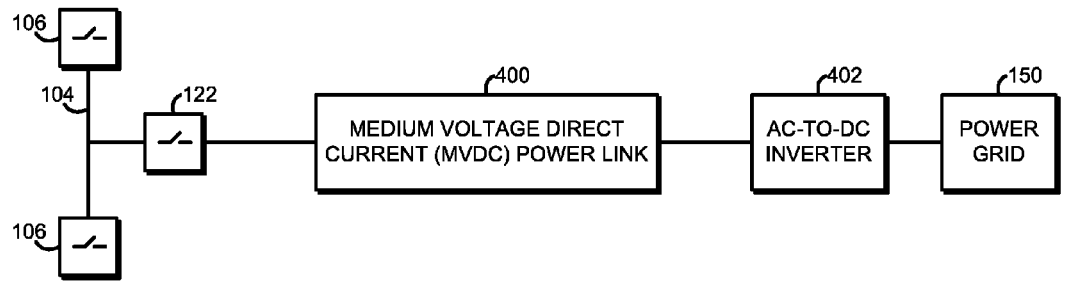
FIG. 4 is a simplified block diagram of at least one embodiment of an on-shore energy supply link of the MVDC power distribution system of FIG. 1.

Referring now to FIG. 4, in some embodiments, one or more of the on-shore supply links of the MVDC power distribution system 100 may be embodied as, or otherwise include, a medium voltage direct current (MVDC) power link 400. In such embodiments, the illustrative on-shore power link furthers include an alternating current-to-direct current (AC-DC) converter 402 electrically coupled to the power grid/source 150 to convert AC power from the power grid/source 150 to a medium voltage direct current power. Similar to the MVDC power bus 102, the MVDC power link 400 may be embodied as any type of power interconnect capable of carrying a medium voltage direct current power, such as a power cables, wires, or similar structure. The magnitude of the DC voltage carried by the MVDC power link 400 may range from about 10 kilovolts DC to about 50 kilovolts DC depending on the power requirements of the associated loads. It should be appreciated that because the MVDC power link 400 is carrying a DC power of a similar magnitude as the MVDC power bus 102, no further power conversion may be needed in such embodiments.

Figure 5:
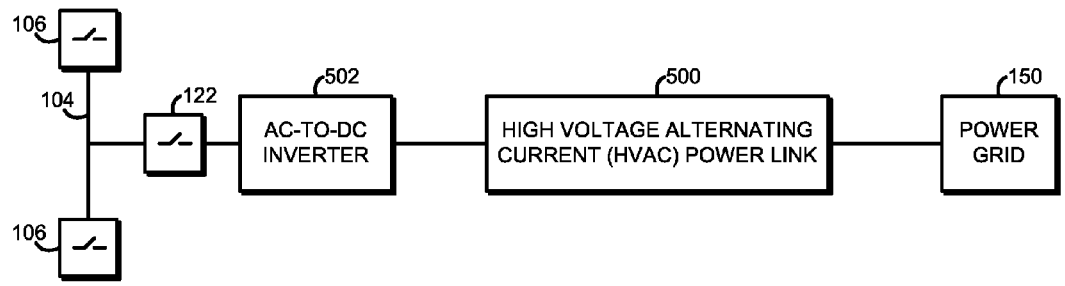
FIG. 5 is a simplified block diagram of at least one additional embodiment of an on-shore energy supply link of the MVDC power distribution system of FIG. 1.

Referring now to FIG. 5, in other embodiments, one or more of the on-shore supply links of the MVDC power distribution system 100 may be embodied as, or otherwise include, a high voltage alternating current (HVAC) power link 500. In such embodiments, the illustrative on-shore power link further includes an alternating current-to-direct current (AC-DC) converter 502 electrically coupled to the MVDC power bus 102 to convert an AC power carried by the HVAC power link 500 from the power grid/source 150 to a medium voltage direct current power carried by the MVDC power bus 102. The HVAC power link 500 may be embodied as any type of power interconnect capable of carrying a high voltage alternating current power, such as a power cables, wires, or similar structure. The magnitude of the AC voltage carried by the HVAC power link 500 may be in the rage of 66-230 kilovolts AC and depend on the AC power delivered from the power grid/source 150 and/or the power requirements of the MVDC power bus 102.

Figure 6:
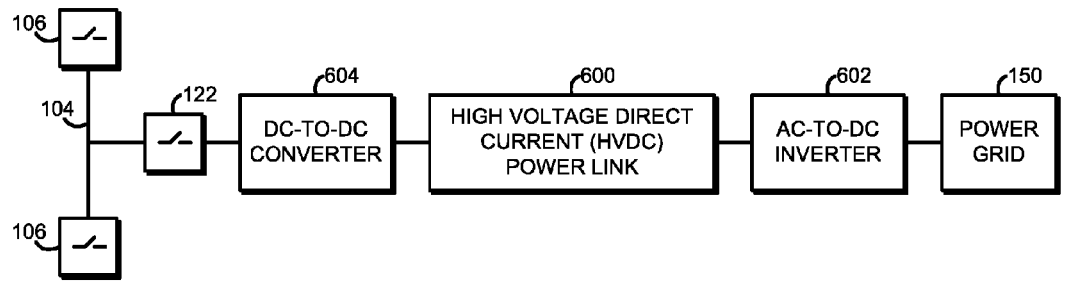
FIG. 6 is a simplified block diagram of at least one additional embodiment of an on-shore energy supply link of the MVDC power distribution system of FIG. 1.

Referring now to FIG. 6, in some embodiments, one or more of the on-shore supply links of the MVDC power distribution system 100 may be embodied as, or otherwise include, a high voltage direct current (HVDC) power link 600. In such embodiments, the illustrative on-shore power link further includes an alternating current-to-direct current (AC-DC) converter 602 electrically coupled to the power grid/source 150 to convert AC power from the power grid/source 150 to a high voltage direct current power and a direct current-to-direct current (DC-DC) converter 604 to convert the high voltage direct current power carried by the HVDC power link 600 to a medium voltage direct current power carried by the MVDC power bus 102. The HVDC power link 600 may be embodied as any type of power interconnect capable of carrying a high voltage direct current power, such as a power cables, wires, or 300 similar structure. The magnitude of the DC voltage carried by the HVDC power link 600 may be greater than 50 kilovolts DC (i.e., higher than the medium voltage direct current power carried by the MVDC power bus 102).

Figure 7:
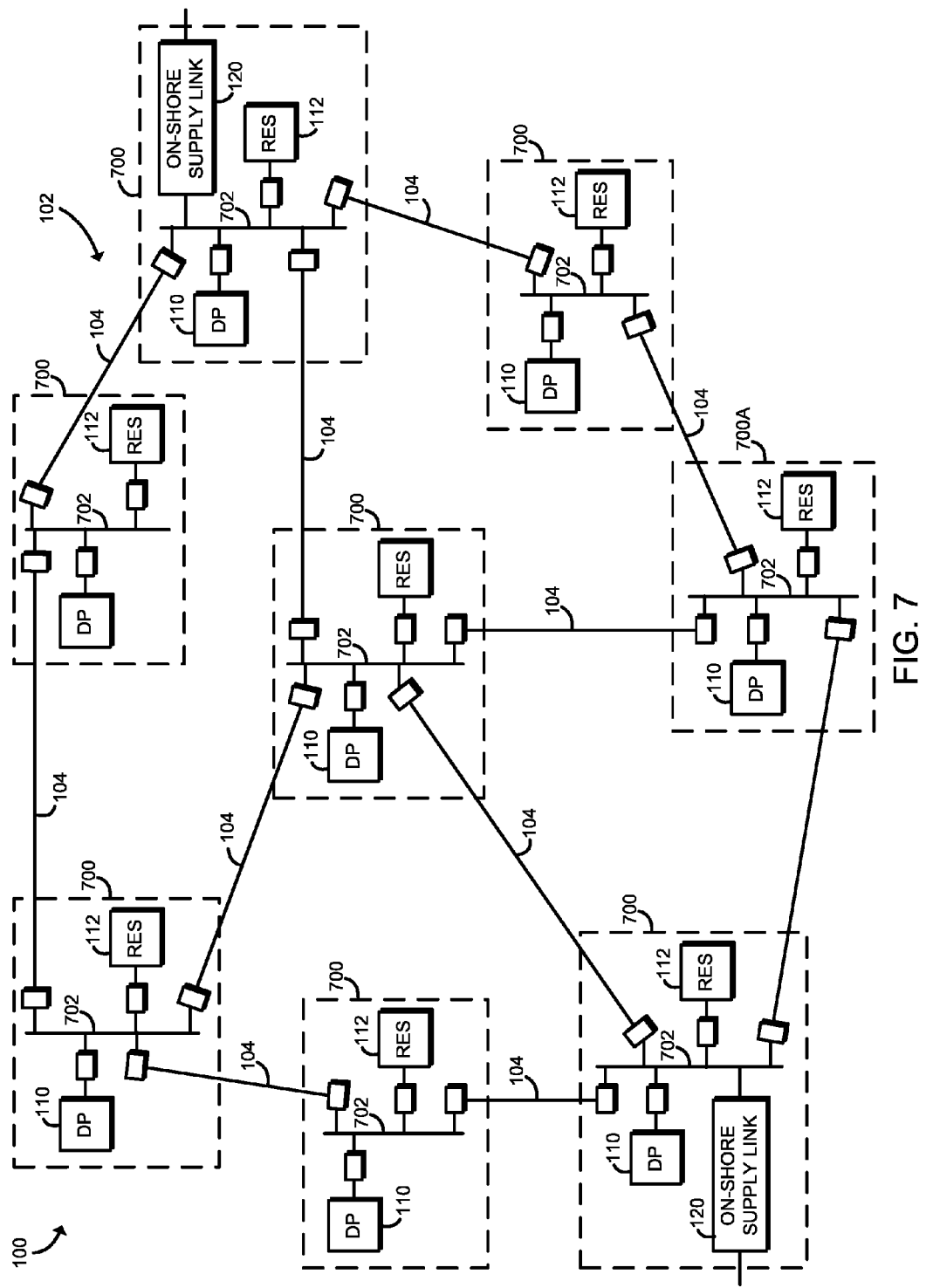
FIG. 7 is a simplified block diagram of at least one additional embodiment of the MVDC off-shore power bus of the MVDC power distribution system of FIG. 1.

Although the MVDC power bus 102 has been shown and described above as having a ring network architecture, it should be appreciated that other network architectures may be used in other embodiments. For example, as shown in FIG. 7, the off-shore MVDC power bus 102 may be embodied as a MVDC power bus mesh network in some embodiments. In such embodiments, each power bus segment 104 of the MVDC power bus 102 is electrically coupled to one or more other power bus segments 104 via corresponding DC circuit breakers 106 (shown in FIG. 7 as a small box) to form a mesh or net layout. To facilitate such interconnection, the MVDC power distribution system 100 of FIG. 7 includes multiple sections 700, each of which includes a local power bus 702. Additionally, each section 700 (or a sub-set of sections 700) may include a local off-shore drilling platform 110 electrically connected to the local power bus 702 via a corresponding DC circuit breaker 300 (shown in FIG. 7 as a small box) and a renewable energy source 112 electrically coupled to the local power bus 702 via a corresponding DC circuit breaker 302 (shown in FIG. 7 as a small box). Each section 700 of the MVDC power distribution system 100 is electrically coupled to other sections 700 via one or more power bus segments 104. Again, it should be appreciated that the mesh architecture of the MVDC power bus 102 allows power to be evenly distributed about the MVDC power bus 102, regardless of where the power is initially produced or finally consumed. Additionally, the mesh architecture of the MVDC power bus 102 allows isolation of the various sections 700 of the MVDC power distribution system 100. For example, should the section 700A (see bottom of FIG. 7) develop a failure, that section 700A may be isolated from the other sections 700 of the MVDC power distribution system 100 by activation of the circuit breakers 106 coupled to each power bus segment 104 associated with the section 700A. In a similar manner, should the remaining sections 700 of the MVDC power distribution system 100 experience a failure, the section 700A may be isolated from the remaining sections 700 by activation of the circuit breakers 106 coupled to each power bus segment 104 associated with the section 700A. In this way, the section 700A may continue proper operation without interference from the failing sections 700 of the MVDC power distribution system 100. Once the failures are attended to, any isolated sections 700 may be reconnected to the other sections 700 to reform the MVDC power bus mesh network.

The invention claimed is:

1. An off-shore medium voltage direct current (MVDC) power distribution system for supplying power to off-shore equipment, the MVDC power distribution system comprising:

an off-shore MVDC power bus comprising a plurality of power bus segments, wherein each power bus segment is electrically connected to at least one other power bus segment via a circuit breaker, and wherein (i) at least one power bus segment of the plurality of power bus segments is electrically coupled to an off-shore renewable energy source configured to supply power to the off-shore MVDC power bus, wherein the renewable energy source includes an off-shore energy storage to reduce variance of power delivery from the renewable energy source, and (ii) at least one power bus segment of the plurality of power bus segments is electrically coupled to a local power distribution system of an off-shore drilling platform, wherein the local power distribution system is configured to receive power from the off-shore MVDC power bus and supply power to a local load of the drilling platform.

2. The off-shore MVDC power distribution system of claim 1, wherein the off-shore MVDC power bus comprises an off-shore MVDC power bus ring network and each power bus segment is electrically connected to only two other power bus segments via corresponding circuit breakers.

3. The off-shore MVDC power distribution system of claim 1, wherein the off-shore MVDC power bus comprises an off-shore MVDC power bus mesh network.

4. The off-shore MVDC power distribution system of claim 1, wherein the off-shore renewable energy source comprises one or more wind turbines configured to supply power to the off-shore MVDC power bus via the corresponding at least one power bus segment.

5. The off-shore MVDC power distribution system of claim 1, wherein the at least one power bus segment electrically coupled to the off-shore renewable energy source comprises a power bus segment of the plurality of power bus segments electrically connected to the off-shore renewable energy source via a corresponding circuit breaker.

6. The off-shore MVDC power distribution system of claim 1, further comprising a plurality of off-shore renewable energy sources, wherein each off-shore renewable energy source is electrically connected to a different power bus segment of the plurality of power bus segments via a corresponding circuit breaker.

7. The off-shore MVDC power distribution system of claim 1, wherein the at least one power bus segment electrically coupled to the local power distribution system comprises a power bus segment of the plurality of power bus segments electrically connected to the local power distribution system via a corresponding circuit breaker.

8. The off-shore MVDC power distribution system of claim 1, wherein the local load comprises an alternating current (AC) load and the local power distribution system includes a direct current-to-alternating current (DC-AC) inverter configured to generate an AC power to the AC load based on a DC power supplied by the off-shore MVDC power bus.

9. The off-shore MVDC power distribution system of claim 1, wherein the local power distribution system includes a local power generation system to supply power to the local power distribution system, wherein the local power generation system comprises an engine-driven diesel or gas generator.

10. The off-shore MVDC power distribution system of claim 1, further comprising a plurality of drilling platforms, wherein each drilling platform includes a local power distribution system electrically connected to a different power bus segment of the plurality of power bus segments via a corresponding circuit breaker.

11. The off-shore MVDC power distribution system of claim 10, wherein the local power distribution system of each drilling platform includes a local energy management system configured to control operation of the corresponding local power distribution system.

12. The off-shore MVDC power distribution system of claim 11, wherein each local energy management system controls the amount of power extracted from the off-shore MVDC power bus by the local power distribution system and the amount of power supplied by the corresponding power bus segment to other power bus segments of the off-shore MVDC power bus.

13. The off-shore MVDC power distribution system of claim 1, wherein the local power distribution system is electrically connected to the corresponding power bus segment via a corresponding circuit breaker and includes a local energy management system configured to control operation of the local power distribution system,
wherein the off-shore renewable energy source includes a controller configured to control operation of the renewable energy source, and
wherein the local energy management system is configured to communicate with the controller to control delivery of the power from the off-shore renewable energy source to the off-shore MVDC power bus.

14. The off-shore MVDC power distribution system of claim 1, further comprising an on-shore supply link electrically coupled to a power bus segment of the plurality of power bus segments, wherein the on-shore supply link is configured to provide power to the off-shore MVDC power bus from an on-shore power source.

15. The off-shore MVDC power distribution system of claim 14, wherein the on-shore supply link comprises a MVDC power link.

16. The off-shore MVDC power distribution system of claim 14, wherein the on-shore supply link comprises a high voltage alternating current (HVAC) power link.

17. The off-shore MVDC power distribution system of claim 14, wherein the on-shore supply link comprises a high voltage direct current (HVDC) power link.

18. An off-shore medium voltage direct current (MVDC) power distribution system for supplying power to off-shore equipment, the MVDC power distribution system comprising:
an off-shore MVDC power bus comprising a plurality of power bus segments, wherein each power bus segment is electrically connected to at least one other power bus segment via a circuit breaker;
a plurality of off-shore renewable energy sources, wherein each off-shore renewable energy source is electrically connected to a different power bus segment of the plurality of power bus segments via a corresponding circuit breaker and wherein at least one renewable energy source includes an off-shore energy storage to reduce variance of power delivery from the corresponding renewable energy source;
a plurality of off-shore drilling platforms, wherein each off-shore drilling platform includes a local power distribution system electrically connected to a different power bus segment of the plurality of power bus segments via a corresponding circuit breaker; and
an on-shore supply link electrically connected to a power bus segment of the plurality of power bus segments via a corresponding circuit breaker, wherein the on-shore supply link is configured to provide power to the off-shore MVDC power bus from an on-shore power source.

19. The off-shore MVDC power distribution system of claim 18, wherein the off-shore MVDC power bus comprises an off-shore MVDC power bus ring network and each power bus segment is electrically connected to only two other power bus segments via corresponding circuit breakers.

20. The off-shore MVDC power distribution system of claim 18, wherein the off-shore MVDC power bus comprises an off-shore MVDC power bus mesh network.

21. The off-shore MVDC power distribution system of claim 18, wherein the on-shore supply link comprises (i) a MVDC power link, (ii) a high voltage alternating current (HVAC) power link, or (iii) a high voltage direct current (HVDC) power link.

* * * * *